United States Patent [19]

Hirakushi et al.

[11] Patent Number: 4,850,447

[45] Date of Patent: Jul. 25, 1989

[54] POWER TRANSMISSION APPARATUS FOR A VEHICLE

[75] Inventors: Shuzo Hirakushi; Yoshiaki Hamasaki; Goki Shimamura, all of Osaka, Japan

[73] Assignee: Koyo Seiko Co., Ltd., Japan

[21] Appl. No.: 194,926

[22] Filed: May 17, 1988

[30] Foreign Application Priority Data

May 18, 1987 [JP] Japan .................................. 62-120382
Jun. 16, 1987 [JP] Japan .................................. 62-149757

[51] Int. Cl.$^4$ ..................... B60K 17/348; F16D 31/06
[52] U.S. Cl. .................................. 180/248; 192/58 A
[58] Field of Search ............... 180/233, 248, 249, 250; 192/59, 58 A, 60, 61

[56] References Cited

U.S. PATENT DOCUMENTS

| | | | |
|---|---|---|---|
| 2,397,140 | 3/1946 | Hickman | 192/60 X |
| 3,298,489 | 1/1967 | Brand | 192/59 X |
| 3,577,803 | 5/1971 | Mueller | 74/665 |
| 3,773,130 | 11/1971 | Mueller | 180/24.09 |
| 4,676,336 | 6/1987 | Hiramatsu | 180/233 |

FOREIGN PATENT DOCUMENTS 61-249827 11/1986 Japan .
2139972 11/1984 United Kingdom ................ 180/248

Primary Examiner—John A. Pekar
Attorney, Agent, or Firm—James D. Hall; Thomas J. Dodd; Todd A. Dawson

[57] ABSTRACT

A power transmission apparatus for a vehicle which is used for a four-wheel drive vehicle driving both the front and rear wheels by a driving force from an engine, in which a discharge amount of a hydraulic pump provided between a front wheel drive shaft and a rear wheel drive shaft to generate hydraulic pressure by a rotation speed difference between the two rotary shafts is desirably adjusted by a remote-controllable variable throttle valve provided on the way of a discharge oil passage extending from the hydraulic pump, so that a simple hydraulic circuit is used to make the coupling of two rotary shafts freely adjustable from loose condition to tight condition.

14 Claims, 5 Drawing Sheets

POWER TRANSMISSION APPARATUS FOR A VEHICLE

BACKGROUND OF THE INVENTION

1. Field of the Invention

The present invention relates to a power transmission apparatus for a vehicle, interposed between a front wheel driving shaft and a rear wheel driving shaft of a four-wheel drive vehicle which drives the front and rear wheels by the same engine, and more particularly to a power transmission apparatus using a hydraulic pump and a four-wheel drive vehicle using the power transmission apparatus.

2. Description of the Prior Art

The four-wheel drive vehicle transmitting a driving force of its engine to the front and rear wheels thereof during the vehicle's running can surely and not-wastefully transmit the driving force onto the road surface, thereby being superior not only in the running efficiency for the road surface of low friction coefficient, or a rough surface such as a gravel road, but also in the accelerating ability and stability during the high speed running even on the usual road surface in comparison with a two-wheel drive vehicle. Hence, the four-wheel drive vehicle has especially recently been spotlighted of its comfortable high speed running without being affected by road condition and a change in weather.

The simplest construction of such four-wheel drive vehicle is to rigidly couple the drive shafts of the front and rear wheels by use of, for example, a dog clutch, which is advantageous in that a driving force of an engine is effectively distributed to the front and rear wheels corresponding to ground pressure, but deflective in that, when a difference between the turning radii of the front and rear wheels during the turning causes a difference between the number of rotations of the front wheels and that of the rear wheels, the difference in the number of rotations cannot be absorbed to thereby cause the so-called tight corner braking phenomenon of dragging the inside rear wheel in slipping and have a drawback in cornering characteristic, resulting in a fear that a propeller shaft between the front and rear wheels is twisted to cause abnormal wearing at a tire.

Accordingly, the conventional four-wheel drive vehicle mainly interposes a power transmission apparatus using a differential gear to permit a rotation speed difference between the front wheel driving shaft and the rear wheel driving shaft.

The differential gear, however, has a characteristic that an output shaft subjected to larger resistance between two output shafts is rotated slower. Hence, the four-wheel drive vehicle provided with such a power transmission apparatus has a drawback that when either of the front wheel or the rear wheel is idle, almost all the driving force of engine is transmitted to the idling wheel, but not to the other drive shaft. In order to eliminate the above drawback, the power transmission apparatus must be provided with a differential locking mechanism which stops operation of the differential gear, or a differential limit mechanism using, for example, wet multiple disc clutch means, for restricting the above differential operation, when the rotation speed difference between both drive shafts exceeds a predetermined value, thereby being considerably complicated in structure.

As above-mentioned, the power transmission apparatus between the front and rear drive shafts at the four-wheel drive vehicle is preferable to have the characteristic that, when the rotation speed difference between both the driving shafts is smaller, both the driving shafts are coupled loosely as the differential gear so that the rotation speed difference is sure to be absorbed, and on the other hand, when the rotation speed difference is larger, both the drive shafts are coupled tight as the aforesaid dog clutch, so that the driving force is properly distributed to both driving shafts corresponding to ground pressure of each tire of the front and rear wheels. The power transmission apparatus realizable by simple construction of both the characteristics contrary to each other uses a hydraulic pump as disclosed in the Japanese Patent Laid-Open Gazettes No. Sho 60-104426 and No. Sho 61-249827.

The power transmission apparatus in the former has a simple construction such that a rotor rotatable together with either one of both the driving shafts is disposed in a casing rotatable together with the other and coaxially with the rotor so as to constitute a hydraulic pump and a proper throttle is provided at a discharge oil passage extending from the pump. Hence, when a rotation speed difference occurs between both the driving shafts, pressure corresponding to the rotation speed difference is created within the hydraulic pump. In this power transmission apparatus, the rotor and casing are coupled with each other by a resistance force (static pressure), the resistance force increasing or decreasing corresponding to variation in the pressure generated by the hydraulic pump, in other words, variation in the rotation speed difference between both the driving shafts, whereby both the drive shafts are coupled tight when the rotation speed difference therebetween is larger, and loosely when the same is smaller.

The power transmission apparatus in the latter gazette is provided between the discharge oil passage and a suction oil passage extending from the hydraulic pump with a by-pass oil passage having on the way a variable throttle, the variable throttle being adjusted to control a flow rate of pressure oil in the by-pass passage, thereby making variable the generated pressure under the same rotation speed of the hydraulic pump, in other words, the resistance force between the rotor and the casing. For example, when the rotation speed difference between both the driving shafts is larger, an opening ratio of the variable throttle is automatically reduced to enable a degree of coupling between both the driving shafts to be tighter, whereby the power transmission apparatus is remarkably advantageous in that the sure running is possible even on a road surface of snowy road of low friction coefficient, or on a rough road surface of a gravel road.

Now, the power transmission apparatus for the four-wheel drive vehicle, as above-mentioned, is preferable to have the characteristic to couple the front wheel drive shaft and rear wheel drive shaft as tight as possible, so that, for example, when either the front wheels or the rear wheels are idle to create a rotation speed difference between the front and the rear wheels, the rotation speed difference therebetween is reduced to reliably transmit almost all the driving force of the engine to the four wheels. In the power transmission apparatus disclosed in the Japanese Patent Laid-Open Gazette No. Sho 60-104426, however, the maximum degree of coupling between the front and rear drive shafts depends on adjusting pressure of a relief valve provided at the discharge oil passage extending from the hydraulic pump, so that when the rotation speed difference between the front and the rear wheels exceeds a predetermined value, a constant torque is transmitted regardless of quantity of the difference, that is, the flow rate, whereby a separate control system is required to distribute a torque corresponding to road condition, thereby creating the defect in that control is complicated and a manufacturing cost also becomes high.

Also, in the power transmission apparatus disclosed in the Japanese Patent Laid-Open Gazette No. Sho 61-249827, besides the problem of the relief valve, the maximum degree of coupling obtained thereby depends not on the opening ratio of the variable throttle provided at the by-pass oil passage, but on that of a stationary throttle provided in the discharge oil passage juxtaposed with the by-pass passage. Since the reduction of opening ratio of the stationary throttle is limited in processing accuracy and also the excessive reduction of opening ration creates a new problem in that clogging occurs by contamination, the rise of maximum degree of coupling is limited. Furthermore, since the by-pass oil passage is formed, there is the defect that the passage is complicated in constitution.

On the other hand, a four-wheel drive vehicle is provided with a four-wheel steering device as one means for preventing the tight corner braking phenomenon, which connects the front and rear wheels tightly and steers the front and rear wheels separately from each other. Such four-wheel drive vehicle, however, must independently be provided with a driving system for the four-wheel driving and a steering system for the four-wheel steering, whereby there is a drawback that the system is complicated, a vehicle body weight increases to increase the number of parts and the manufacturing cost becomes high.

SUMMARY OF THE INVENTION

In order to solve the aforesaid problem, the present invention has been designed.

A first object of the invention is to provide a power transmission apparatus for four-wheel driving which adjusts an opening ratio of a throttle provided at an oil passage extending from a hydraulic pump interposed between two rotary shafts, thereby enabling a degree of coupling therebetween to be properly set from loose coupling to tight coupling as much as possible.

A second object of the invention is to provide a power transmission apparatus for four-wheel driving which enables the aforesaid setting by simple oil passage constitution.

A third object of the invention is to provide a four-wheel drive vehicle which uses the power transmission apparatus for four-wheel driving so that, when the vehicle runs straight-forwardly, an opening ratio of a throttle valve is reduced to couple the front wheels and the rear wheels as tight as possible and a driving force of an engine is properly distributed to be transmitted to four wheels, and when the sauce turns, the opening ratio of the throttle valve is increased to loosely couple the front and rear wheels, thereby reliably preventing the occurrence of tight corner braking phenomenon and obtaining a comfortable steering feeling.

The above and further objects and features of the invention will more fully be apparent from the following detailed description with accompanying drawings.

DESCRIPTION OF THE PREFERRED EMBODIMENTS

Figure 1:
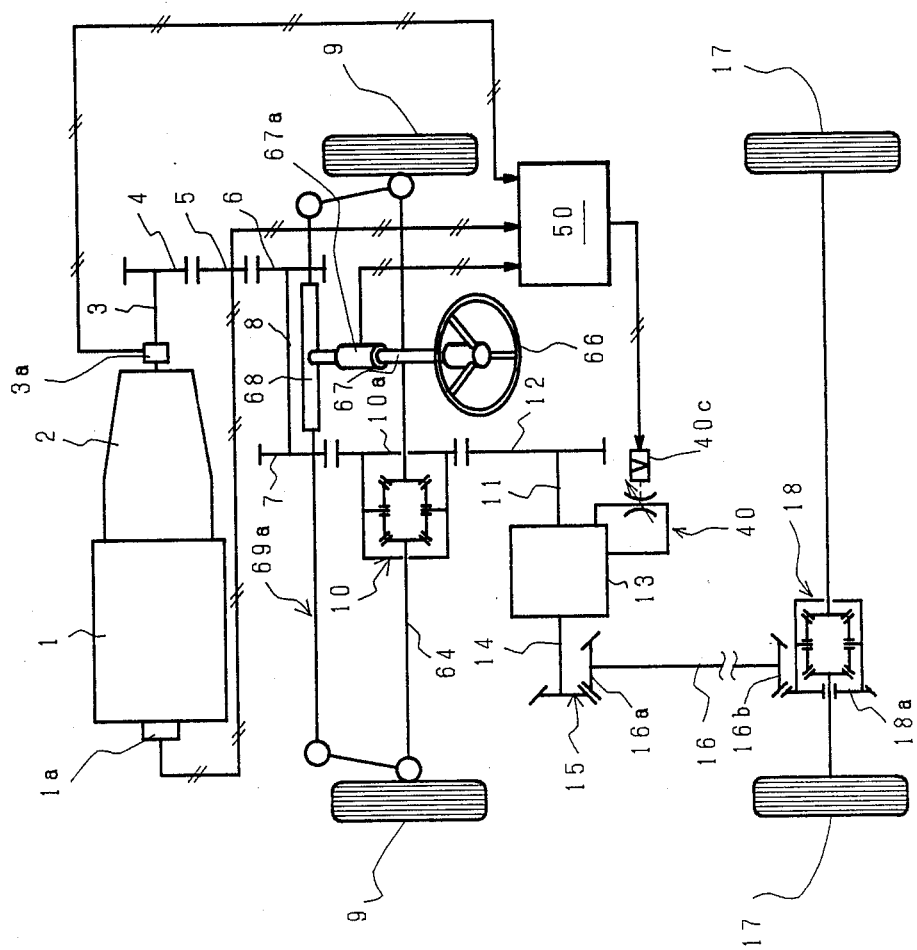
FIG. 1 is a schematic plan view of a first embodiment of a four-wheel drive vehicle equiped with a power transmission apparatus for four-wheel driving of the invention, showing constitution of a transmitting system together with a steering system at a four-wheel drive vehicle.

Next, an embodiment of a power transmission apparatus for four-wheel driving of the invention will be detailed with reference to the drawing.

Referring to FIG. 1 showing a transmitting system and a steering system of a first embodiment of a four-wheel drive vehicle equipped with a power transmission apparatus for four-wheel driving of the invention (to be hereinafter referred to as the apparatus of the invention), an engine 1 is laterally disposed at the front of a vehicle body and a driving force generated thereby is transmitted through a transmission 2 connected to one side of the engine to an output shaft 3 extending laterally of the transmission 2, thereby rotating a drive gear 4 fitted onto the utmost end of the output shaft 3.

An intermediate transmission shaft 8 is disposed in parallel to the output shaft 3 and a pair of spur gears 6 and 7 are fitted onto both ends of the transmission shaft 8, one spur gear 6 engaging with the other side of an idle gear 5 engaging with the drive gear 4, the other spur gear 7 engaging with one side of a spur gear 10a formed at the oute periphery of a casing for a differential gear unit 10 for driving front wheels 9, 9.

The rotation of drive gear 4 is transmitted to the intermediate transmission shaft 8 through the idle gear 5 and spur gear 6 and then to the differential gear unit 10 through the spur gears 7 and 10a, so that the differential gear unit 10 operates to transmit the driving force of the engine 1 to left and right front wheels 9 individually.

Figure 2:
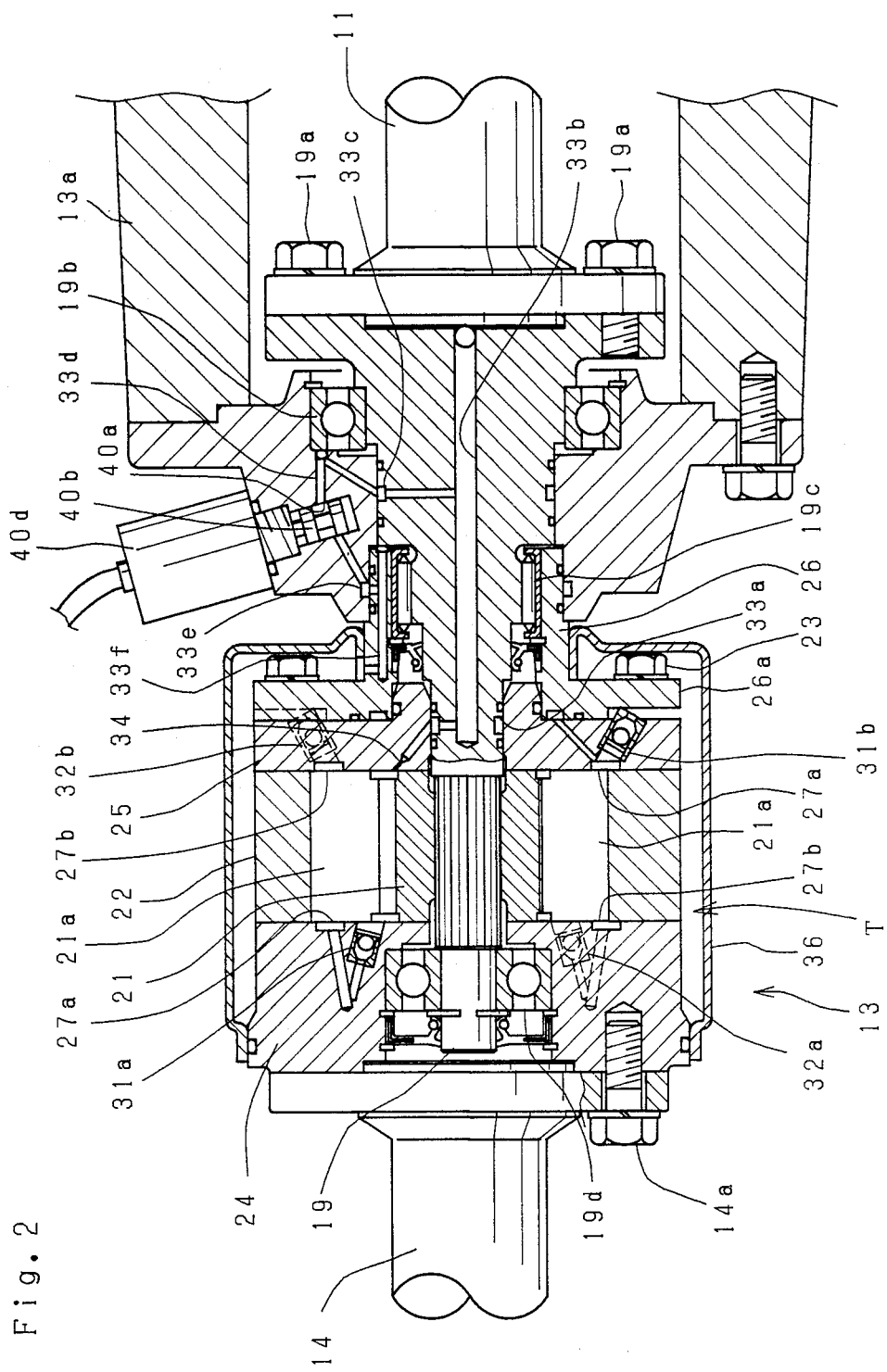
FIG. 2 is a partially cutaway sectional view of the power transmission apparatus for four-wheel driving of the invention.
Figure 3:
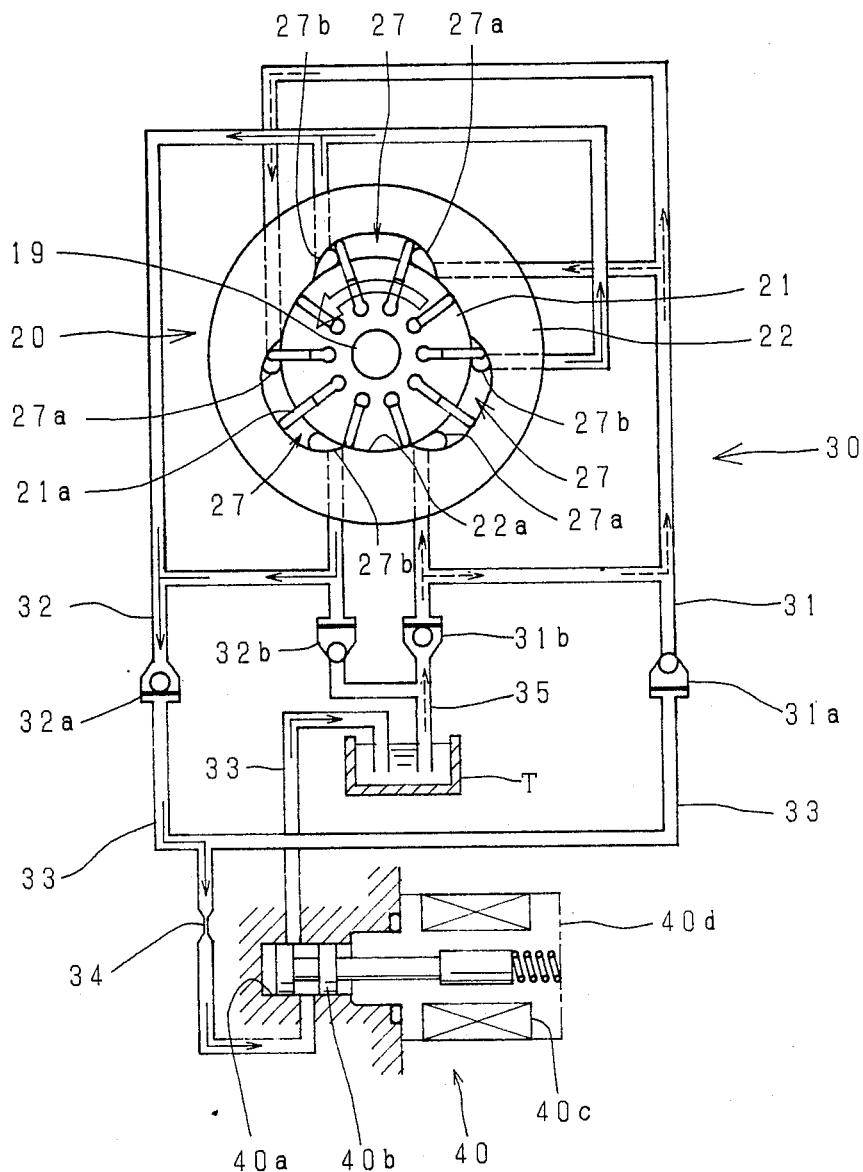
FIG. 3 is a hydraulic circuit diagram of the power transmission apparatus for four-wheel driving of the invention.

On the other hand, the spur gear 10a engages at the other side with a spur gear 12 fitted onto one end of a first rotary shaft 11 extending laterally of the vehicle body, the other end of the rotary shaft 11 being mounted to one side of a power transmission apparatus 13 formed mainly of a vane pump 20 (refer to FIGS. 2 and 3). A second rotary shaft 14 in alignment with the first rotary shaft 11 and insertably supporting at one end a bevel gear 15 is mounted at the other end to the other side of the power transmission apparatus 13, the bevel gear 15 engaging with a bevel gear 16a fitted onto the front end of a propeller shaft 16 extending longitudinally of the vehicle body, a bevel gear 16b fitted onto the rear end of the propeller shaft 16, engaging with a bevel bear 18a formed at the outer periphery of a casing of a differential gear unit 18 for driving the rear wheels 17.

The driving force transmitted to the first rotary shaft 11 from the intermediate transmission shaft 8 through the spur gears 10a and 12 is transmitted to the second rotary shaft 14 through the power transmission apparatus 13, and then to the differential gear unit 18 through the bevel gears 15 and 16a, propeller shaft 16 and bevel gear 16b, thereby being separately transmitted by operation of the gear unit 18 to the left and right rear wheels 17, 17 respectively.

In the drawing, a steering wheel 66 connects coaxially with a steering shaft 67. The steering shaft 67 extends forwardly downwardly and is mounted at the utmost end onto a kinetic direction change mechanism 68 of, for example, a rack-and-pinion system disposed in the steering mechanism 69a for the front wheels 9, 9 so that when the steering shaft 67 rotates around its axis corresponding to rotation of the steering wheel 66, the rotation is converted by the kinetic motion change mechanism 68 into the laterally straight motion, and the steering mechanism 69a operates corresponding to the linear motion so as to steer the front wheels 9, 9.

Further, an energized control unit 50 using a microcomputer and for controlling the opening ratio of a variable throttle or orifice 40 to be discussed below is provided, an input terminal of the energized control unit 50 being given detection signals from an engine rotation detector 1a, a vehicle speed detector 3a mounted to the output shaft 3 of the transmission 2, and a steering angle detector 67a mounted on an intermediate portion of the steering shaft 67 respectively, and a solenoid coil 40c at the variable throttle or orifice 40 being given a control signal from the output terminal of the energized control unit 50.

FIG. 2 is a partially cutaway sectional structural view of the power transmission apparatus 13 of the invention, and FIG. 3 is a hydraulic circuit diagram thereof.

The power transmission apparatus 13 mainly comprises a vane pump 20 and a hydraulic circuit 30 accompanying the same. The vane pump 20 comprises a short cylindrical rotor 21, an annular cam ring 22 of wall eccentricity having a cavity 22a whose cross section being as shown in FIG. 3 at the axial center, with three recesses of circular arc, distributed in equal distance, circumferentially at a circle about equal in outer diameter of the rotor 21, and being about equal in axial length of rotor 21, and side plates 24 and 25 disposed at both axial sides of the cam ring 22 in a manner of sandwiching the cam ring 22 therebetween, and fixed to each other with fixing bolts 23.

The rotor 21 is provided with a plurality of strip-like grooves which are formed radially inwardly from the outer periphery, each have a predetermined depth, are circumferentially disposed at regular intervals, and extend entirely axially of the rotor 21, rectangular plate-like vanes 21a, 21a... being inserted into the grooves in relation of being slidable therealong and radially of the rotor 21. The rotor 21 keeping the vanes 21a, 21a... inserted is disposed in a space formed of the cavity 22a at the cam ring 22 between the side plates 24 and 25 and spline-coupled at the axial center with a main shaft 19 at the fore end portion thereof so as to rotate following the rotation thereof. Also, the main shaft 19 is fixed at the root thereof to the first rotary shaft 11 coaxially therewith by the bolts 19a, 19a within a cylindrical main shaft housing 13a and supported through a ball bearing 19b, thereby following the rotation of the rotary shaft 11.

One side-plate 25 positioned at the main shaft housing 13a side has at a side facing the housing 13a a cylindrical support member 26 integrally provided at one axial end with a disc-like flange 26a, being fixed at the flange 26a to the side plate 25 through fixing bolts 23, 23 ... the support member 26 being fitted at the other axial end into the main shaft housing 13a in relation of being coaxial therewith and rotatable around the axis. Between the support member 26 and the main shaft 19, a needle roller bearing 19c is interposed to coaxially position both the members. Furthermore, the other side plate 24 fixes, at a side surface reverse to a surface in contact with the cam ring 22, the second rotary shaft 14 is fitted coaxially therewith through bolts 14a, a ball bearing 19d being interposed between the side plate 24 and the main shaft 9 so as to keep both the side plate 24 and main shaft 19 coaxial with each other. Accordingly, the cam ring 22 and side plates 24 and 25, which are integral by the fixing bolts 23, 23 ... to constitute a casing for the hydraulic pump 20, rotate together with the second rotary shaft 14 while being held by the support member 26, needle roller bearing 19c and ball bearing 19d, coaxially with the rotor 21 fitted onto the main shaft 19.

Now, between the outer periphery of the rotor 21 disposed in the cavity 22a at the cam ring 22 as above-mentioned and the inner surfaces of three recesses at the cavity 22a are formed three pump chambers 27, 27, 27 surrounded by these and the side plates 24 and 25 and crescent in section as shown in FIG. 3 respectively. At each pump chamber 27 are formed a pair of suction and discharge ports 27a and 27b which are positioned at the both ends of crescent and open at both the side plates 24 and 25 and disposed sequentially in the rotating direction of the rotor 21 shown by the void arrow in FIG. 3. The respective three suction and discharge ports 27a and 27b differently function corresponding to the rotating direction of the rotor 21. When the rotor 21 rotates in the direction of the void arrow (to be hereinafter referred to as the normal rotation) in FIG. 3 relative to the cam ring 22, the suction and discharge ports 27a, 27a, 27a serve as the suction ports and those 27b, 27b, 27b serve as the discharge ports. On the other hand, when the rotor 21 rotates in the reverse direction to the void arrow (to be hereinafter referred to as the reverse rotation) in FIG. 3, the suction and discharge ports 27b, 27b, 27b serve as the suction ports and those 27a, 27a, 27a as the discharge ports.

As shown in FIG. 3, the suction and discharge ports 27a, 27a, 27a communicate with each other through a first oil passage 31, those 27b, 27b, 27b communicating with each other through a second oil passage 32, the first and second oil passages 31 and 32 communicating with a discharge oil passage 33 through check valves 31a and 32a for permitting an oil flow from the respective oil passages. The discharge oil passage 33 is provided on the way with a fixed orifice and a variable orifice as a variable throttle means disposed in series, so that oil flowing into the discharge passage 33 from the first or second oil passage 31 or 32 passes sequentially the fixed orifice 34 and variable orifice 40 and then circulates to an oil tank T. The variable orifice 40 is so constructed that a valve body 40b is axially movably inserted into a valve chest 40a formed about perpendicularly to extending direction of the discharge oil passage 33 and round in section, and the valve body 40b moves in reciprocation corresponding to energization to a solenoid 40c. When the valve body 40b projects, an opening ratio of the orifice 40 decreases, and on the contrary, when the same retracts, the opening ratio increases.

Also, the first and second oil passages 31 and 32 communicate with the suction oil passage 35 through check valves 31b and 32b which permit the oil flow only into the respective oil passages, the oil in the oil tank T passing either the check valve 31b or 32b and flows into the first or second oil passage 31 or 32 from the suction oil passage 35.

The oil tank T, as shown in FIG. 2, is fitted in part on the outer peripheries of side plate 24 and support member 26. A thin enclosure 36 of bottomed cylinder is mounted to enclose the side plate 24, cam ring 22, side plate 25 and support member 26, and the suction and discharge ports 27a and 27b formed between the above members and open at the side plate 25 side communicate with the oil tank T through the check valves 31b and 32b, the suction and discharge ports 27a and 27b open at the side plate 24 side communicating with the discharge oil passage 33 through the check valves 31a and 32a respectively.

The oil having passed the check valve 31a or 32a flows on the bottom of the groove at the rotor 21 lengthwise thereof and is guided to the fixed orifice 34 formed at the side plate 25. The oil, after passing the fixed orifice 34, is guided from an annular groove 33a formed at the outer periphery of the main shaft 19 to an oil passage 33b formed at the axis of main shaft 19 and extending axially thereof, and, after flowing in the oil passage 33b, guided into an oil passage 33d formed at the housing 13a from the annular groove 33c formed at the outer periphery of the main shaft 19 positioned in the main shaft housing 13a. The valve chest 40a is formed at a proper position of the main shaft housing 13a so as to be positioned on the way of the oil passage 33d, the casing 40d for the solenoid 40c being screwably fixed to the main shaft housing 13a so as to keep the valve body 40b inserted in the valve chest 40a, as above described. The oil guided into the oil passage 33d, after having passed the valve chest 40a, is introduced from an annular groove 33e formed at the inner periphery of the main shaft housing 13a into an oil passage 33f formed at the support member 26 and extending axially thereof, and thereafter circulates into the oil tank T. Thus, the discharge oil passage 33 comprises the oil passages 33b, 33d and 33f and annular grooves 33a, 33c and 33e and, as shown in FIG. 2, can efficiently be formed in the components of the apparatus of the invention.

Next, explanation will be given on operation of the power transmission apparatus of the invention constructed as above-mentioned.

At first, during the straightforward running at constant speed on the usual road surface, as far as the effective radii of the front and rear wheels 9 and 17 are equal, slip rotation scarcely occurs therebetween, whereby the first rotary shaft 11 is equal to the second rotary shaft 14 in rotation speed, resulting in that no relative rotation occurs between the rotor 21 and the cam ring 22 at the vane pump 20. Hence, the vane pump 20 generates no hydraulic pressure so that the driving force of the engine 1 is transmitted not to the rear wheels 17, 17 but only to the front wheels 9, 9, whereby a vehicle equipped with the power transmission apparatus of the invention runs by the front two-wheels drive.

Next, in the state where the front wheels 9, 9 are different from the rear wheels 17, 17 in the rotational speed, when the front wheels are idling due to a slip during the running, for example, on a snow-covered road, the rotation speed of the first rotary shaft 11 becomes lager than that of the second rotary shaft 14, resulting in that the rotor 21 normally rotates relative to the cam ring 22 at the speed corresponding to a rotation speed difference. Following the relative rotation, in each pump chamber 27 at the vane pump 20, such hydraulic pressure that, the pressure at the suction and discharge port 27b positioned downstream in the rotating direction becomes larger than that at the suction and discharge port 27a positioned at the upstream side, is generated. Accordingly, the first oil passage 31 communicating with the suction and discharge ports 27a communicates with the suction oil passage 35 because the check valve 31a is closed and that 31b is open. Also, the second oil passage 32 communicating with the suction and discharge ports 27b communicates with the discharge oil passage 33 because the check valve 32a is open and that 32b is closed, whereby oil flow occurs in the hydraulic circuit 20 in the direction of the arrows in FIG. 3.

On the contrary, when the rotation speed of the first rotary shaft 11 becomes smaller than that of the second rotary shaft 14, the rotor 21 reversely rotates relative to the cam ring 22 at the speed corresponding to the rotation speed difference. As a result, in each pump chamber 27 of the vane pump 20 such hydraulic pressure that, the pressure at the suction and discharge port 27a positioned at the downstream side in the rotating direction becomes larger than that at the suction and discharge ports 27b positioned at the upstream side, is generated. Accordingly, conversely to the above, the first oil passage 31 communicates with the discharge oil passage 33, and the second oil passage 32, with the suction oil passage 35, so that the oil flow reverse to the direction of the arrows in FIG. 3 occurs in the hydraulic circuit 20.

When a rotational speed difference is thus created between the first rotary shaft 11 and the second rotary shaft 14, hydraulic pressure is generated at each pump chamber 27 at the vane pump 20, a resistance force corresponding to the generated pressure acts on the inner periphery of the cam ring 22 in the direction of restricting the relative rotation between the cam ring 22 and the rotor 21, and part of driving force of the first rotary shaft 11 connected to the rotor 21 is transmitted through the resistance force to the second rotary shaft 14 connected to the cam ring 22, whereby the vehicle equipped with the apparatus of the invention runs by four-wheel drive.

At this time, the driving force transmitted to the second rotary shaft 14 is proportional to intensity of the resistance force, the resistance force being proportional to the generated pressure in each pump chamber 27 at the vane pump 20. The generated pressure is univocally determined by passage resistance at the hydraulic circuit 30 on the characteristic curve of the vane pump 20 corresponding to the rotation speed difference between the rotor 21 and the cam ring 22, and when the rotation speed difference is the same, the generated pressure increases as the passage resistance increases. Accordingly, in the apparatus of the invention, energization control to the solenoid 40c at the variable orifice 40 is carried out to change the opening ratio of the orifice 40 and passage resistance of the discharge oil passage 33, thereby enabling a transmission ratio of the drawing force from the first rotary shaft 11 to the second rotary shaft 14 to be changed. In other words, when the opening ratio of the variable orifice 40 is large, since the passage resistance at the discharge oil passage 33 is small, the generated pressure in the vane pump 20 is small and the first and second rotary shafts 11 and 14 are loosely coupled with each other. When that of the variable orifice is small, the passage resistance of the discharge oil passage 33 is large. As a result, the generated pressure in the vane pump 20 is larger, the first and second rotary shafts 11 and 14 are in condition of being coupled tight, and even when the rotation speed difference between the first and the second rotary shafts 11 and 14 is equal, in the latter case, transmission quantity of the driving force to the second rotary shaft 14 becomes larger in comparison with the former case. Especially, when the opening ratio of the variable orifice 40 becomes 0, the discharge oil passage 33 is completely closed and the vane pump 20 is under shut-off operation. As a result, the generated pressure of the pump 20 is maximum and the coupling state as rigid as possible is obtained between the first rotary shaft 11 and the second rotary shaft 14, thereby distributing the driving force of the engine 1 to the front and rear wheels 9, 9 and 17, 17 corresponding to ground pressure.

Figure 4:
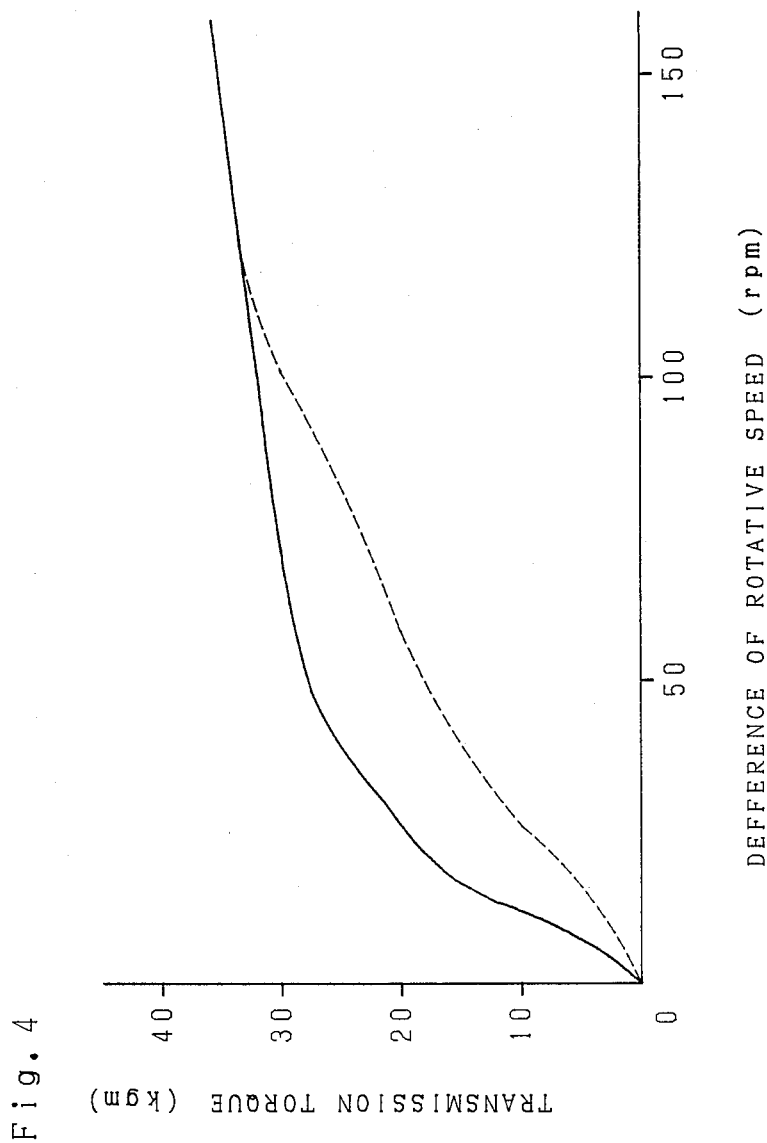
FIG. 4 is a graph showing a characteristic of transmitting torque to a rear-wheel drive shaft at a four-wheel drive vehicle equipped with the power transmission apparatus for four-wheel driving of the invention.

Referring to FIG. 4, a graph exemplary of the relation between the rotation speed difference of first and second rotary shafts 11 and 14 and the transmission torque to the second rotary shaft 14, in which the characteristic of entirely closing the variable orifice 40 is shown by the solid line and that of entirely opening the same by the broken line.

As seen from the drawing, when the variable orifice 40 is completely closed, the torque curve steeply rises, and when the rotational speed of the second rotary shaft 14 is slightly smaller (or larger) than that of the first rotary shaft 11, a large torque is transmitted to the second rotary shaft 14 and the rigid coupling is realized between the first rotary shaft 11 and the second rotary shaft 14. Conversely, in the case that the variable orifice 40 is entirely open, even when the rotation speed of the second rotary shaft 14 becomes fairly smaller (or larger) than that of the first rotary shaft 11, the torque transmitted to the second rotary shaft 14 is small and the first rotary shaft 11 and second rotary shaft 14 are under a loose coupling condition. In the apparatus of the invention, the solenoid 40c is adjusted of intensity of its energization to enable the opening ratio of variable orifice 40 to be set in a proper value from full close to full open, whereby a proper transmission torque characteristic between the characteristic shown by the solid line and that shown by the broken line in FIG. 4 can selectively be adopted.

It is preferable that the solenoid 40c is automatically energized by an energization control unit 50 corresponding to the running condition. For example, the solenoid 40c is subjected to energization control on the basis of the detected results of the engine rotation speed sensor 1a and vehicle speed sensor 3a, so that when the engine speed is abnormally larger with respect to the vehicle speed under the normal running, the energization control unit 50 decides that the vehicle is running on a bad road such as a dirt or a gravel road, or a road surface such as a snowy road of low friction coefficient, whereby the opening ratio of the variable orifice 40 is reduced and the degree of coupling between the front wheels 9, 9 and the rear wheels 17, 17 is automatically increased, resulting in that the stable running even on the bad road or the snowy road is realizable.

The solenoid 40c is controlled of its energization on the basis of the detected result of the steering angle detector 67a mounted on the rotary shaft of the steering wheel, and the opening ratio of variable orifice 40 is enlarged as the steering angle becomes larger, so that when abrupt steering is carried out, the degree of coupling of the front wheels 9, 9 and rear wheels 17, 17 is automatically weakened, thereby enabling the tight corner braking phenomenon to be effectively avoided.

Besides this, in the case that a brake switch is disposed to be on corresponding to tread pressure on a foot brake and the energization control to the solenoid 40c is carried out corresponding to the on-off condition of the switch. When the foot brake is subjected to the tread pressure, the opening ratio of variable orifice is reduced, thereby enabling the front and rear wheels 9, 9 and 17, 17 to be prevented from being locked and the stable braking action to be exerted.

Furthermore, the energization of solenoid 40c is controlled corresponding to oil temperature in the oil tank T and the change in characteristic of the vane pump 20 accompanied by a viscosity change in oil is corrected, thereby always obtaining a predetermined degree of coupling in spite of temperature change in oil.

Figure 5:
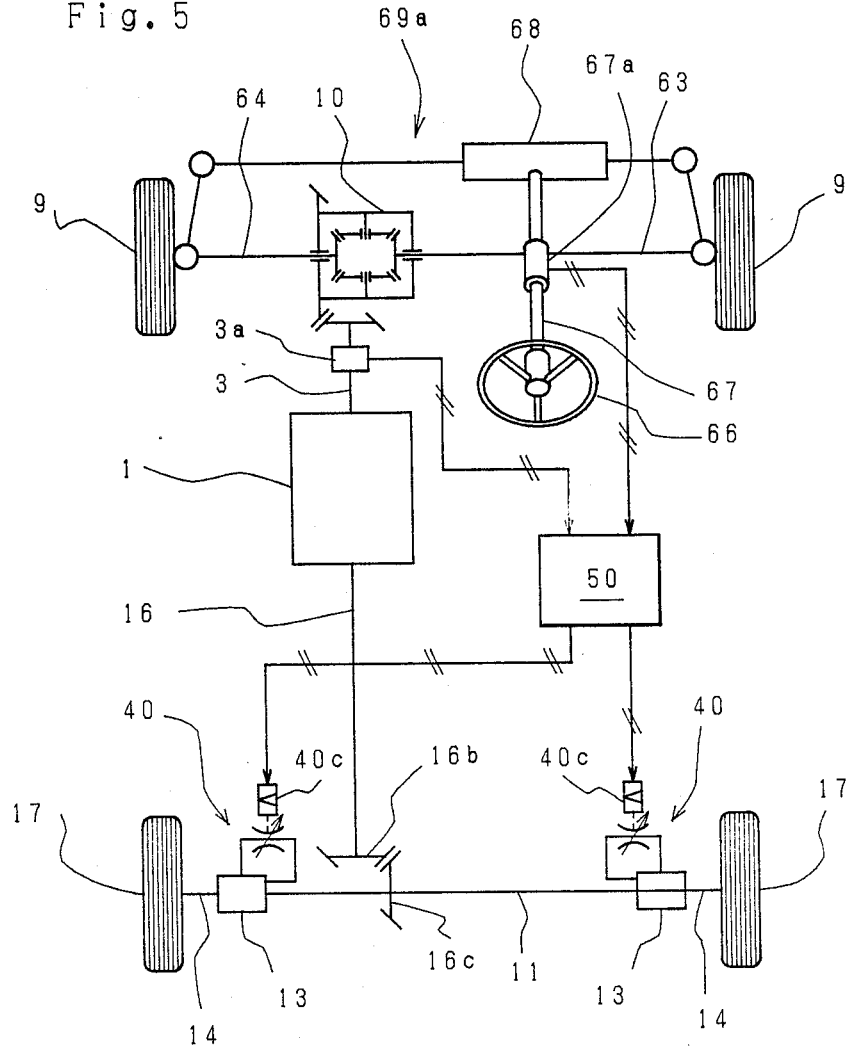
FIG. 5 is a schematic plan view of a second embodiment of a four-wheel drive vehicle equipped with the power transmission apparatus for four-wheel driving of the invention, showing constitution of a transmitting system together with a steering system of the four-wheel drive vehicle.

Next, explanation will be given on a second embodiment of the apparatus of the invention showing its transmission system and steering system in FIG. 5. A driving power unit 1 comprises the engine and the transmission, and a first output shaft 3 extending forwardly from the power unit 1 is connected through a differential gear unit 10 to front wheel drive shafts 64, 64 extending laterally from the vehicle body, the left and right front wheels 9, 9 being mounted coaxially to the utmost ends of drive shaft 64 respectively.

Thus, the front wheels 9, 9 are rigidly coupled with the driving power unit 1, and the driving force generated therefrom is transmitted separately to each front wheel 9 through the first output shaft 3, differential gear unit 10 and each front wheel drive shaft 64 for rotating the front wheels 9, 9 so that the differential gear unit 10 is adapted to absorb the rotation speed difference created between the front wheels 9, 9.

In the drawing, a steering wheel 66 connects coaxially with a steering shaft 67. The steering shaft 67 is provided at the utmost end frontwardly downwardly extending with a kinetic direction change mechanism 68 of, for example, rack and pinion type disposed in the steering mechanism 69a for the front wheels 9, 9. When the steering shaft 67 rotates around the axis, corresponding to the steering operation of the steering wheel 66 the rotation is converted by the kinetic direction change mechanism 68 into the laterally linear motion, so that the steering mechanism 69a operates correspondingly thereto so as to steer the front wheels 9, 9.

Meanwhile, a second output shaft 16 extending rearwardly from the power unit 1 connects through pair of bevel gears 16b and 16c with a rear wheel drive shaft 11 extending laterally from the vehicle body, the left and right ends of the rear wheel drive shaft 11 being connected to the left and right rear wheels 17, 17 through power transmission apparatus 13, 13 respectively.

In addition, each power transmission apparatus 13 is of the same structure and circuit as in the first embodiment.

Next, explanation will be given on operation of the power transmission apparatus using a vane pump 20 constructed as in the first embodiment. Referring to FIG. 2, as above-mentioned, the rotor 21 rotates following the rear wheel drive shaft 11 and the cam ring 22 rotates together with the side plates 24 and 25 and support member 26 following the rotation of rotary shaft 12a, whereby, when a difference is created between the rotation speed of the rear wheel drive shaft 11 and that of each rear wheel 17, relative rotation between the rotor 21 and the cam ring 22 is created at the rotation speed equal to the rotational speed difference therebetween.

When the relative rotation is in the direction of the void arrow shown in FIG. 3, oil in the oil tank T passes the check valve 31b and is sucked from each separate suction and discharge port 27a to each pump chamber 27 at the vane pump 20. Pressure of the oil is raised as the rotor 21 rotates so that the oil is discharged from each suction and discharge port 27b. In other words, the suction and discharge port 27a at each pump chamber 27 functions as the suction port and that 27b as the discharge port, whereby generating hydraulic pressure in each pump chamber 27. Meanwhile, when the direction of the relative rotation is reverse to the direction of the void arrow in FIG. 3, conversely, the suction and discharge port 27b functions as the discharge port and that 27a as the suction port, thereby generating hydraulic pressure in the same as the above. When such hydraulic pressure is generated, an resistance force or static pressure corresponding to the generated pressure acts on the inner peripheries of rotor 21 and cam ring 22 in the direction of restricting the relative rotation therebetween, the resistance force or the static pressure will generate a coupling force between the rear wheel drive shaft 11 connected to the rotor 21 and the rear wheels 12 connected to the cam ring 22.

The coupling force generated at the power transmission apparatus 13 depends on the generated pressure of the vane pump 20, the generated pressure increases or decreases corresponding to quantity of the relative rotation speed between the rotor 21 and the cam ring 22, that is, of the rotation speed difference generated between the rear wheel drive shaft 11 and the rear wheels 17, 17 and varies corresponding to the quantity of passage resistance of the discharge oil passage 33 under the same rotation speed difference. Hence, the opening ratio of the variable throttle 40 disposed at the discharge oil passage 33 is changed, whereby the transmission characteristic of driving force from the rear wheel drive shaft 11 to the rear wheels 17, 17 is changeable and the rear wheel drive shaft 11 and rear wheels 17, 17 are rigidly coupled as the opening ratio of the variable throttle is small.

The opening ratio of the variable throttle 40 is changed by changing the intensity of energization of the solenoid 40c to move the valve body 40b in reciprocation as above-mentioned. Referring to FIG. 5, an energization control unit 50 controls the intensity of energization to the left and right solenoids 40c, 40c so as to change the driving force transmission characteristic at the left and right power transmission apparatus. The energization control unit 50 is given at the input side signals corresponding to the steering angles of the front wheels 9, 9 from a steering angle detector 67a mounted on the way of the steering shaft 67 and a signal corresponding to the vehicle speed from a vehicle speed detector 3a mounted on the way of the first output shaft 3 through which the driving force of the power unit 1 is transmitted to the front wheels 9, 9.

The steering angle detector 67a need only use, for example, a potentiometer, a rotary encoder or the like for outputting potential corresponding to an amount of rotation of the steering shaft 67. The output signal from the steering angle detector 67a is subjected to the predetermined process at the energization control unit 50 so that the steering direction and steering angle from the straightforward running condition of the front wheels 9, 9 are adapted to be recognized. Also, the vehicle speed detector 3a need only use a rotation speed detector which detects teeth at a detection gear fixed to, for example, the first output shaft 3 by use of an electromagnetic pickup provided opposite to the teeth, or a rotational speed detector for detecting the number of rotations by turning on-off a reed switch provided close to the first output shaft. The output signal from the rotational speed detector is counted at the energization control unit for a predetermined time, and from this count value the number of rotations of the first output shaft 3 is computed, and further the vehicle speed is computed from the computed value, a speed reduction ratio at the differential gear unit 16, and an effective diameter of each front wheel 9.

Now, explanation will be given on operation of the four-wheel vehicle of the second embodiment of the apparatus of the invention constructed as above-mentioned, on the basis of operation of the energization control unit 50.

The energization control unit 50, as above-mentioned, recognizes the steering direction and steering angle from the straight forward running by the output signal from the steering angle detector 67a. Hence, when the steering angle is smaller than the preset value regardless of the steering direction, the control unit 50 decides that the present running condition is the straightforward running so as not to issue the output to each variable throttle 40.

Accordingly, when the straightforward running condition is maintained, both the solenoids 40c, 40c are deenergized and the opening ratio of each variable throttle 40 is kept zero, whereby at the vane pump 20 of power transmission apparatus 13, high hydraulic pressure is generated with respect to a minute rotation speed difference generated between the rear wheels 17, 17 and the rear wheel drive shaft 11 and both the left and right rear wheels 17, 17 are coupled as rigidly as possible with the rear wheel drive shaft 11. The driving force generated at the power unit 1 is properly distributed corresponding to ground pressure and transmitted to the front and rear wheels 9, 9 and 17, 17, thereby materializing the straightforward running superior in stability.

On the other hand, in a case that the steering wheel 66 is rotated to steer the front wheels 9, 9, the energization control unit 50 recognizes the steering by the input signal from the steering angle detector 67a, and recognizes the steering direction and steering angle so as to operate as follows:

The energization control unit 50, upon recognizing the steering being carried out, issues separate output signals to the variable throttles 40, 40 at the respective power transmission apparatuses 13, 13 and flows in the solenoid 40c at each variable throttle 40 a predetermined current decided by the steering angle recognized at that time and the vehicle speed computed as abovementioned by the input signal from the vehicle speed detector 3a. The predetermined current is decided at the energization control unit 50 according to formula or numeral tables presorted in the control unit 50 on the basis of the experimental results that the turning of various turning radii are carried out at various vehicle speeds to examine running paths of the front and rear wheels 9, 9 and 17, 17, the current being adapted to increase as the steering angle becomes larger and decrease as the vehicle speed becomes high. An increase ratio of the current depends on the steering direction of the front wheels 9, 9, and when the steering direction is leftward, the increase ratio of current at the solenoid 40c of the left side power transmission apparatus 13 is adapted to be larger. On the contrary, when the steering direction is rightward, that of the right side solenoid 40c becomes larger.

Hence, the opening ratio of each variable throttle 40 increases corresponding to the steering angle and vehicle speed so that each power transmission apparatus 13 obtains a loose transmission characteristic as the steering angle becomes larger and as the vehicle speed becomes smaller under the same steering angle. Furthermore, when the steering is carried out leftwardly (or rightwardly), since the intensity of energization to the solenoid 40c at the left side (or the right side) variable throttle 40 is always larger than that of the right side solenoid 40c (or the left side one), a further loose driving force transmission characteristic can be obtained at the left side (or the right side) power transmission apparatus 13.

Thus, in a case that the four-wheel drive vehicle of the invention turns, when it steeply turns at high speed, the energization control unit 50 operates as aforesaid to weaken the coupling force between each rear wheel 17 and the rear wheel drive shaft 11, especially, since that between the rear wheel 17 inside the turning circle and the rear wheel drive shaft 11 is weakened, the driving force of the power unit 1 is transmitted in part to the rear wheel 17 outside the turning circle and scarcely transmitted to the rear wheel 17 inside the same, whereby the rear wheel 17 inside the turning circle rotates corresponding to friction to the road surface to generate no tight corner braking phenomenon, and smooth cornering is possible. As a result, the driving force transmitted to the rear wheel 17 outside the turning circle sufficiently ensures the safety when the vehicle turns on a road such as a snowy road of low friction coefficient, or a bad road such as a gravel road. Also, when a lateral torque is positively controlled, the four-wheel drive vehicle is intended to be forcibly turned following the control, thereby obtaining the effect of four-wheel steering (4 WS).

In the aforesaid two embodiments, a vane pump is used as a hydraulic pump, but it goes without saying that a hydraulic pump of other type, such as an internal gear pump or a trochoidal pump, which changes the generated pressure corresponding to the rotation speed difference between two rotary shafts may alternatively used.

Also, in the aforesaid two embodiments, the opening ratio of variable orifice 40 is changed by energization to the solenoid 40c, but alternatively, when an automatic transmission is used, the valve body 40b at the variable orifice 40 may be moved by use of constant hydraulic pressure for control, thereby changing the opening ratio.

Furthermore, in the first embodiment, the power transmission apparatus 13 may alternatively be provided between two axially divided parts of the propeller shaft 16.

Also, in the second embodiment, alternatively the variable throttles 40, 40 may be constructed to vary the opening ratio thereof on the basis of the detected result either of the steering angle detector 67a or the vehicle speed detector 3a.

As seen from the above, the power transmission apparatus of the invention is of simple construction of providing the orifice of variable opening ratio in the hydraulic circuit between the suction port and the discharge port at the hydraulic pump, thereby largely simplifying its construction in comparison with the conventional power transmission apparatus. Also, the opening ratio of the orifice is changed to enable the coupling condition between the front wheel drive shaft and the rear wheel drive shaft to be properly set from a condition as rigid as possible to a loose condition, whereby the first embodiment of the four-wheel drive vehicle rigidly couples the front and rear wheels to ensure transmission of the driving force required to both the wheels to thereby realize the stable running on a road of low friction coefficient or a rough road surface, and loosely couples the same during the turning, thereby reliably avoiding the occurrence of tight corner braking phenomenon.

Also, the second embodiment of the four-wheel drive vehicle rigidly couples the front and rear wheels during the straightforward running, whereby the driving force of the engine is properly distributed corresponding to ground pressure to be transmitted to each wheel, thereby obtaining a superior stability especially during the running at high speed or acceleration. Also, since the degree of coupling the left and right rear wheels with the rear wheel drive shaft is set corresponding to the steering angle and/or the vehicle speed during the turning, the same effect as the four-wheel steering apparatus can be obtained without provision thereof and the occurrence of tight corner braking phenomenon can reliably be prevented.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A power transmission apparatus for a vehicle comprising:

a hydraulic pump which connects to rotary shafts transmitting a driving force so as to generate hydraulic pressure corresponding a rotational speed difference between said rotary shafts, said hydraulic pump including suction and discharge ports, and hydraulic fluid circulating passage connecting said suction and discharge ports, stationary throttle means disposed in said circulating passage for providing a variable set of transmitted torque values between said rotary shafts in relation to the difference in rotative speed of such shafts, and variable throttle means operable independently of said hydraulic fluid disposed in said circulating passage for modifying said set of transmitted torque values.

2. The power transmission apparatus for a vehicle as set forth in claim 1, wherein said variable throttle means increases said set of transmitted torque values as the difference in rotative speed of said shafts increase.

3. A power transmission apparatus for a vehicle as set forth in claim 2, wherein said variable throttle means includes a valve chest, a valve body disposed in said valve chest and movable axially therein, and a solenoid means connected with said valve body within the valve chest from a point where the throttle means is fully open to a point where the throttle means is fully closed.

4. The power transmission apparatus for a vehicle as set forth in claim 1, wherein said stationary throttle means and said variable throttle means are series connected by said circulating passage.

5. A power transmission apparatus for a vehicle as set forth in claim 1, wherein said stationary throttle means and said variable throttle means are disposed vertically.

6. A power transmission apparatus for a vehicle as set forth in claim 1, wherein said hydraulic pump is a vane pump comprising: a cylindrical rotor smaller in axial length and coupling with one of said rotary shafts, a cam ring housing therein and rotating said rotor, and two side plates which sandwiches therebetween said cam ring from both axial ends thereof, one of said side plates coupled with the other of said rotary shafts and supporting said rotor.

7. A power transmission apparatus for vehicle as set forth in claim 1, wherein said variable throttle means is controlled depending on an operation parameter of said vehicle.

8. A power transmission apparatus as set forth in claim 7, wherein said operation parameter is the rotation speed of an engine at said vehicle.

9. A power transmission apparatus for a vehicle as set forth in claim 7, wherein said operation parameter is the speed of said vehicle.

10. A power transmission apparatus for a vehicle as set forth in claim 7, wherein said operation parameter is a degree of brake actuation.

11. A power transmission apparatus for a vehicle as set forth in claim 7, wherein said operation parameter is information indicative of a rate of steering.

12. A four-wheel drive vehicle comprising:
a vehicle speed detector;
a steering angle detector for detecting a steering angle of a front wheel;
two hydraulic pump means connected between a rear wheel drive shaft and a left rear wheel and between said rear wheel drive shaft and a right rear wheel respectively for generating from hydraulic fluid a hydraulic pressure corresponding to a rotation speed difference between each said rear wheel and its said rear wheel drive shaft;
variable throttle means operable independently of said hydraulic fluid disposed in a fluid discharge passage extending from each of said hydraulic pumps and having a variable opening ratio;
stationary throttle means disposed in said fluid discharge passage; and
opening ratio control means for respectively changing the opening ratio of said variable throttle means corresponding to the detected result of said steering angle detector or said vehicle speed detector or a combination thereof.

13. A four-wheel drive vehicle as set forth in claim 12, wherein said opening ratio control means increases said opening ratio as a steering angle detected by said steering angle detector becomes larger.

14. A four-wheel drive vehicle as set forth in claim 12, wherein said opening ratio control means decreases said opening ratio as said vehicle speed detected by said vehicle speed detector becomes higher.

* * * * *